April 21, 1970     I. FISNAR ETAL     3,507,195
STRIP-FEED AND TAKE-UP MAGAZINE

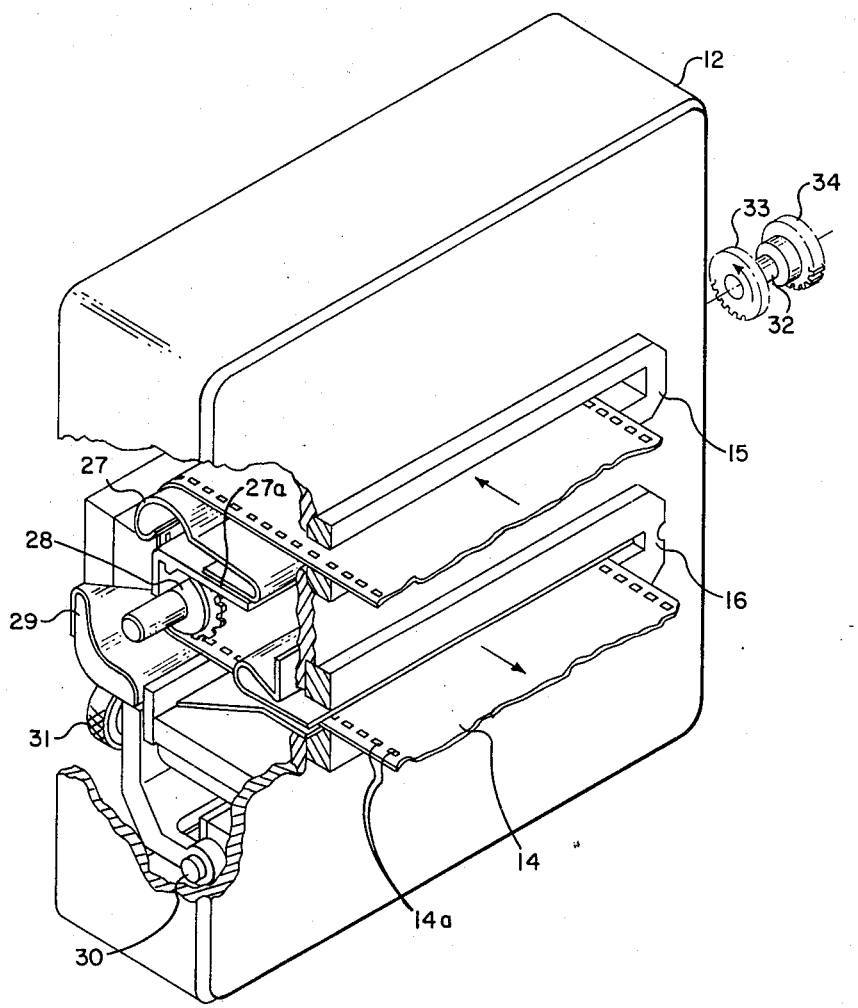
FIG I

Filed Aug. 28, 1967     2 Sheets-Sheet 2

United States Patent Office 3,507,195
Patented Apr. 21, 1970

3,507,195
STRIP-FEED AND TAKE-UP MAGAZINE
Igor Fisnar, Bayside, and Russell H. Lester, Jr., Commack, N.Y., assignors to Fairchild Camera and Instrument Corporation, a corporation of Delaware
Filed Aug. 28, 1967, Ser. No. 663,846
Int. Cl. G03b 17/26, 17/48, 19/04
U.S. Cl. 95—4.5         2 Claims

ABSTRACT OF THE DISCLOSURE

A film transport includes a feed reel, a film-advancing and exposing unit, and a take-up reel unit. The use of guide rollers, dancer rollers, and the like is eliminated by a resilient arcuate cylindrical plate in the exposure unit engaging a film being exposed and a second resilient arcuate cylindrical plate extending from the periphery of a chamber housing the take-up reel to the reel hub which has a friction surface. The absence of rollers simplifies threading the transport, the take-up reel unit being self-threading.

BACKGROUND OF THE INVENTION

This invention relates to a strip-feed and take-up magazine and, while it is of general application, it is particularly suitable for use in association with a phototypesetting apparatus of the type described and claimed in copending application Ser. No. 519,906, filed Jan. 11, 1966, now Patent No. 3,434,402, John M. McCall, and assigned to the same assignee as the present application.

There have heretofore been proposed and marketed a wide variety of strip transports, particularly transports for conducting photographic film through various types of photographic equipments. In general, such film transports have included complex film-guiding mechanisms including guiding channels and idler rollers, dancer rollers, etc. Film transports of such type inherently present the problem of initially threading the film through the mechanism, which can only be done with the housing for the feed and take-up reels open. This requires that the threading operation take place in a dark room removed from the photographic equipment. This is not only inconvenient and time consuming but involves the risk of possible inadvertent exposure of a substantial part of the photographic film.

It is an object of the invention therefore to provide a new and improved strip-feed and take-up magazine which substantially or completely eliminates the use of rollers of all types, with the exception of a single strip-advancing roller, and including a strip take-up unit which is completely self-threading.

SUMMARY OF THE INVENTION

In accordance with the invention, there is provided a strip-feed and take-up magazine adapted for engagement with a strip-processing apparatus comprising a strip-feed reel and a self-threading strip take-up mechanism to which the strip is fed from the feed reel including a generally cylindrical chamber having a strip-entrance guide slot, a driven winding hub having a friction surface disposed in the chamber, and a resilient arcuate cylindrical plate extending from the periphery of the strip take-up chamber to the winding hub and tangent thereto. The magazine further comprises a light shutter including a pair of cylindrical elements normally biased into engagement to close the guide slot and one or more pins normally protruding from the strip-processing apparatus and engageable with the magazine to separate the shutter elements. The term "arcuate" is used herein and in the appended claims in its general sense and is not limited to a segment of a circular cylindrical surface.

BRIEF DESCRIPTION OF THE DRAWINGS

For a better understanding of the present invention, together with other and further objects thereof, reference is had to the following description, taken in connection with the accompanying drawings, while its scope will be pointed out in the appended claims.

Referring to the drawings:

FIG. 1 is a perspective view, partly broken away, of a film-advancing and exposing unit forming a part of the invention;

FIG. 2 is a perspective view, partly broken away, of film-feed and film take-up units for use in associaton wth the unit of FIG. 1, while

DETAILED DESCRIPTION OF THE PREFERRED EMBODIMENT

Figure 3:
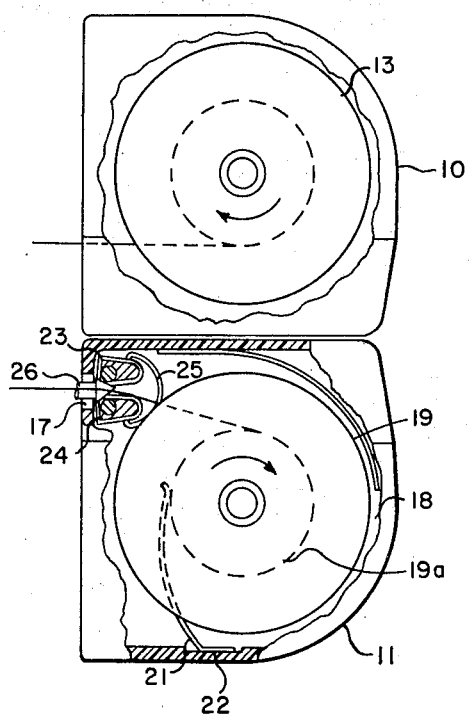
FIG. 3 is a simplified end view, partly in section, of the apparatus of FIG. 2.
Figure 2:
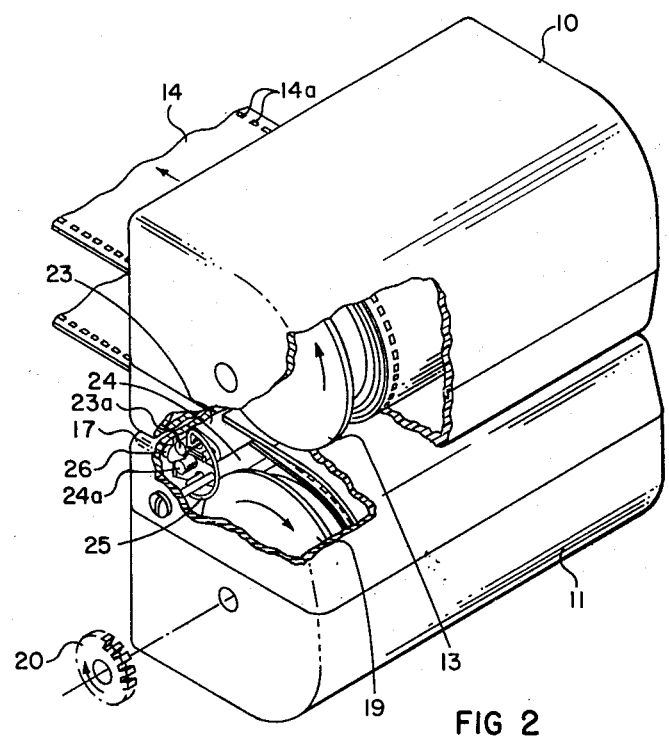

Referring now more specifically to the drawings, there is illustrated a strip-feed and take-up magazine comprising a strip-feed unit 10 and a strip take-up unit 11 which are adapted for engagement with a strip-processing unit 12. The unit 10 includes a strip-feed reel 13 on which is mounted a roll of film 14 having conventional sprocket holes 14a for advancing the film through the equipment. The film 14 passes through an upper guide slot 15 of unit 12, through an exposure region to be described, and out of a lower exit guide slot 16 from which it enters a guide slot 17 in the film take-up unit 11. As shown more clearly in FIG. 3, the film take-up unit 11 includes a generally cylindrical chamber 18 with which the guide slot 17 communicates approximately tangentially. Within the chamber 18 is a winding reel 19 driven by a gear 20 and having a hub 19a with a friction surface, for example hard rubber.

A resilient arcuate cylindrical plate 21 (FIG. 3) is attached at 22 to the lower periphery of the chamber 18 and extends therefrom to a light engagement with the hub 19a and is tangent thereto. The film take-up unit 11 includes a shutter normally closing the guide slot 17 and responsive to the engagement of the film take-up unit 11 of the film magazine and the film-processing unit 12 for opening the shutter to admit the film 14 as it protrudes from the guide slot 16. Specifically, the shutter comprises a pair of cylindrical elements 23, 24 pivotally disposed just above and below the guide slot 17 and biased into engagement to close the guide slot 17 as, for example, by a pair of biasing springs 25 at either end of the unit. At either end of the shutter elements 23, 24 are extending pins 23a and 24a, respectively, and a transverse pin 26 normally protruding from the back of the chamber 18 and engageable with the housing of the strip-processing unit 12 upon engagement with the film magazine 11 therewith. The pin 26 has a tapered head and, upon the engagement as described, acts upon the pins 23a, 24a to separate the shutter elements 23, 24, thus automatically to admit through the guide slot 17 the film 14 emerging from the guide slot 16 of the unit 12 and automatically closing upon disengagement of film magazine 11.

Referring specifically back to FIG. 1, the film 14 entering the guide slot 15 passes over a resilient arcuate cylindrical plate 27 attached at 27a to the frame of the machine and, thence, over a strip-advancing sprocket roll 28 and through the exit guide slot 16, the exposure of the film taking place between the plate 27 and the roll 28 by the equipment with which the magazine is associated. The cylindrical plate 27 is parallel to the axis of the strip-advancing roll 28 and resiliently engages the film 14 passing through the unit, performing the function of a dancer roll. In order to aid in threading the film 14 through the unit 12, there is provided an approximately quarter-circular housing element 29 pivoted on the frame at 30 so that it may be swung away from the film-advancing roll 28. After the film has been threaded through the unit 12, the element 29 is swung into the position shown in FIG. 1 and secured in such position by a thumb nut 31.

The units 10 and 11 are preferably independently attached to the unit 12 by conventional means (not shown) so that each can be readily engaged with or disengaged from the unit 12. Preferably, this engaging means provides for latching the units 10 and 11 to the unit 12 when they are in engagement and for releasing them for disengagement. The film-advancing roll 28 has a shaft 32 extending from the casing of the unit 12 and provided with a driving gear 33 and a knob 34 to permit manually advancing the film through the unit 12.

OPERATION

It is believed that the operation of the strip-feed and take-up magazine of the invention will be apparent from the foregoing description. In brief, the unit 10 with a feed reel 13 containing a roll of film is swung into engagement with the unit 12 with the film projecting through the guide slot 15 thereof. The film is manually threaded over the resilient arcuate plate 27 and over the film-advancing roll 28 with the sprocket holes engaging the sprockets of roll 28. By dropping down the element 29 as described, the film is passed around the roll 28 and through the exit guide slot 16. Before engaging the film take-up unit 11 with the unit 12, the portion of the film 14 exposed during the threading operation is cut off by means not shown.

The unit 11 is then swung into engagement with the unit 12, the shutter elements 23 and 24 having been separated upon engagement of the pins 26 with the housing of the unit 12. Upon advancing of the film through the guide slot 17, either manually by the knob 34 or automatically during operation of the photographic equipment with which the film transport is associated, the film enters the chamber 18, as shown more clearly in FIG. 3, and is deflected by the periphery of the chamber 18 and by the resilient arcuate plate 21 to engage the friction surface of the hub 19a. The film has sufficient stiffness to be deflected by the periphery of the chamber 18 and the plate 21 to engage the hub 19a, which is continuously overdriven by the gear 20 through a friction clutch forming a part of the photographic equipment. Due to the friction surface of the hub 19a and the light engagement with the resilient plate 21, the film is drawn therebetween and, as the hub 19a continues its rotation, the film is automatically engaged throughout the periphery of the hub 19a and is wound thereon. Thus the resilient plate 21, in association with the friction surface of the hub 19a, serves automatically to thread film entering through the guide slot 17 into the chamber 18 so that it is wound upon the hub 19a.

In the operation of the apparatus as a whole, as the film is advanced through the unit 12 by the sprocket roll 28, the resilient arcuate plate 27 performs the function of the usual dancer roller, developing a predetermined tension in the film 14 and absorbing irregular differences between the velocity of the film at the roll 28 and that of the film as it leaves the feed reel 13.

Thus there is provided a strip-feed and take-up magazine apparatus which completely eliminates the use of idler rollers, guide rollers, dancer rollers, and the like, the only roller present being the film-advancing sprocket roll 28. This considerably simplifies the threading operation of the film through the apparatus, as described, and also considerably simplifies and reduces the cost of the film transport apparatus.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A strip-feed and take-up magazine adapted for engagement with a strip-processing apparatus comprising:
   a strip-feed reel;
   a self-threading strip take-up mechanism to which the strip is fed from said feed reel including a generally cylindrical chamber having a strip-entrance guide slot,
   a driven winding hub having a friction surface disposed in said chamber,
   a resilient arcuate cylindrical plate extending from the periphery of said chamber to said hub and tangent thereto,
   and a light shutter including a pair of cylindrical elements normally biased into engagement to close said guide slot;
   and one or more pins normally protruding from said strip-processing apparatus and engageable with the magazine to separate said shutter elements.

2. A strip-feed and take-up magazine in accordance with claim 1 in combination with a strip-processing apparatus including a strip-advancing roll and a resilient convex arcuate cylindrical plate parallel to the axis of said advancing roll biased to engage and tension a strip being processed and performing the function of a dancer roll.

References Cited

UNITED STATES PATENTS

| 2,223,525 | 12/1940 | Miller | 352—75 |
| 2,578,283 | 12/1951 | Bornemann | 95—34 |
| 2,844,991 | 7/1958 | Badgley | 352—75 |
| 2,959,111 | 11/1960 | Walker | 95—4.5 |

JOHN M. HORAN, Primary Examiner